July 31, 1956 M. E. WILLOUGHBY 2,756,987
TORCH SUPPORT
Filed Sept. 4, 1952

INVENTOR.
MARK E. WILLOUGHBY
BY
Richard P. Cardew
AGENT

United States Patent Office 2,756,987
Patented July 31, 1956

2,756,987
TORCH SUPPORT

Mark Ernest Willoughby, Minneapolis, Minn.

Application September 4, 1952, Serial No. 307,797

1 Claim. (Cl. 266—23)

This invention relates to a support for a metal cutting torch and is an improvement over my inventions on which Patents Nos. 2,281,814 and 2,341,751 have been granted.

One of the difficulties encountered in the use of a mechanical torch support is that it is difficult to traverse them along their track at a uniform speed so that a smooth cut is obtained. If the torch travels at varying speeds in cutting a given piece of metal the cut is ragged and, of course, this is undesirable.

It is one of my principal objects to provide a torch support having automatic means to govern the speed of travel of the torch along the guide track when cutting to insure smooth cutting and to prevent the torch's being extinguished because of its moving too fast in cutting and being unable to cut as fast as it is moving. This latter occurs when the torch is moved in surges rather than at a steady pace along its cut, Another object is to provide such means of as simple and inexpensive construction as possible, yet one which will be fool-proof.

Another object is to provide such a device which can be used when running a torch in either direction along the guide track.

Another object is to provide such a device which is adjustable so that the height of the torch from the work piece may be regulated, as well as permitting the cutting of metal at an angle if desired.

Another object is to provide such a device which may be moved by hand pressure or which may be moved by means of a motor, preferably a spring wound motor, because of its small cast.

These and other objects and advantages of my invention will become more apparent as the description proceeds.

In the accompanying drawing forming a part of this application:

Figure 2:
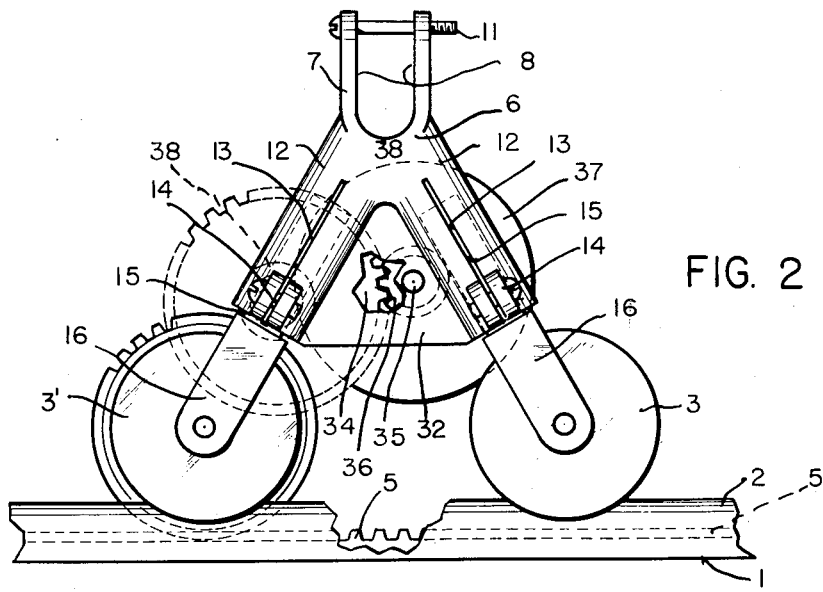
Fig. 2 is a side view of Fig. 1, with parts broken away.
Figure 1:
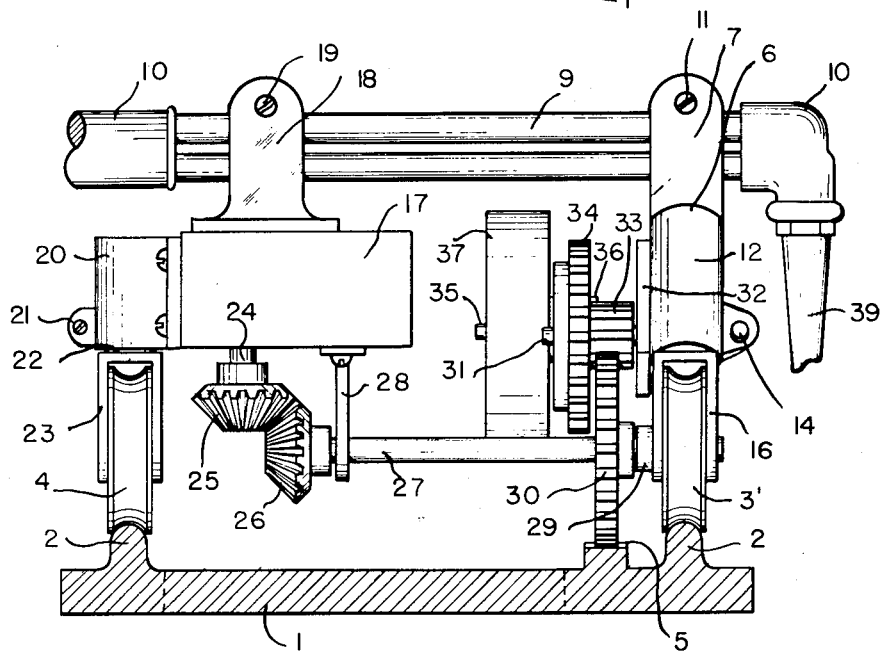
Fig. 1 is an end elevational view showing my device in place on a section of guide track.

In the drawing, the reference numeral 1 indicates the guide track which, generally is common to cutting torch supports and has a pair of spaced tracks 2—2 raised therefrom to receive the wheels or rollers 3 and 3' and 4 of the support. The guide track 1 for use with my invention has a toothed rack 5 running the length of the guide adjacent one of the tracks 2, as shown.

One side of my support comprises an inverted Y-shaped member 6 having a stem 7 which is slotted as at 8 to receive the tubular neck 9 of the torch 10. A clamping bolt 11 is provided to secure the torch in the stem 7. The legs 12—12 of the member 6 comprise a pair of tubular members, each split as at 13 and provided with a clamping screw arrangement 14 to tighten or loosen the grips of the tubes on the inner telescope portion 15 of the legs. The lower ends of each of the telescopic members 15 are provided with a U-shaped yoke 16 to receive one of the wheels 3 and 3'. The telescopic arrangement of the legs permits the raising and lowering of that side of the torch if angular cuts are desired, as is deemed apparent.

The opposite end of the torch may be supported on any suitable wheeled leg, if desired. For example, the leg 13 shown in my Patent No. 2,341,751, with a suitable wheel or roller could be used if desired and of course it would be clamped on the tubular neck 9 of the torch in the manner shown to support the rear end of the torch at its desired relationship to the forward or cutting end and to the guide track 1 and workpiece, not shown.

I have here shown, however, a spring wound motor 17 for use in driving the torch along the guide track. This spring wound motor could be used, of course, and this would necessitate modifying the mounting for the inner wheel 4. I have here provided a yoke 18 to receive and hold the inner end of the neck 9 of the torch, the yoke having a clamping screw 19 and being mounted on the motor 17.

On the side of the motor, I secure a split tubular housing 20 having a clamping arrangement 21 to secure the telescopic member 22 in adjusted position in the housing 20, the telescopic member has a yoke 23 to receive the wheel 4. The wheel 4, telescopic member 22 and housing 20 along with the yoke 18 comprise a leg to support the inner end of the torch, as is deemed apparent.

The spring motor may be wound by a key, not shown, of course. The motor has a power or motor shaft 24 extending therefrom on which a bevel gear 25 is fixedly mounted to rotate with the shaft 24 when the latter is driven by the motor. A bevel gear 26 is carried adjacent and in mesh with the gear 25 on a drive shaft 27 whereby the drive shaft will be rotated by the motor. The drive shaft is rotatably carried in bearings 29 on the yoke, as shown. The wheel 3' is fixedly mounted on the drive shaft to rotate therewith.

Adjacent the wheel 3' a drive gear 30 is mounted on the shaft to rotate therewith, the gear 30 being so positioned between the wheels 3' and 4 of a large enough diameter as to engage the rack 5 on the guide track when the torch support is in place thereon.

A stub shaft 31 is fixedly mounted on the mounting plate 32 which is fixedly carried between the legs 12—12 of the outer torch support member 6. On the stub shaft is mounted a pair of gears 33 and 34 which are fixed together or made integral with each other to rotate together. The gear 30 engages the small gear 33 and rotates same and the gear 34 simultaneously the speed of rotation of the gears 33 and 34 being greater than that of the gear 30, obviously.

A second stub shaft 35 mounted on the plate 32 adjacent to the shaft 31, and a small gear 36 is mounted thereon to intermesh with the gear 34 and be rotated thereby at a greater speed, obviously, than the large gear 34.

Fixed to, or integral with the gear 36 is a flywheel 37 which rotates with the gear 36 on the shaft 35 and at the same speed as the gear 36 travels. The gears 33 and 34 and gear 36 flywheel are preferably mounted on ball bearings suggested at 38 to facilitate their rotation.

This arrangement provides a governor for the speed of rotation of the drive shaft 27, as is deemed apparent and prevents any sudden changes in speed of the drive shaft's rotation.

From the above it can readily be seen that the spring motor will rotate the drive shaft 27 so as to cause the gear to rotate and move longitudinally of the rack 5. At the same time, the entire torch support mechanism and the torch will be moved along the track. The speed at which the motor 17 moves the mechanism will be governed by the governor gears and flywheel arrangement so that the device can neither start too fast or stop too fast, nor will there be any noticeable changes of pace as the mechanism travels the length of the track. It is well known, of course, that an inexpensive spring wound motor does not deliver a steady source of power, but that this power varies as the spring unwinds and movement might be jerky without the governor as I have provided it.

The gear 30 insures steady movement with no slippage of the device on the track, as might be present if no governor and gear were present. The mechanism will progress smoothly and evenly along the track under the power of the spring motor 17.

Obviously, the position of the end of the torch cutting tip 39 relative to the workpiece is adjusted to suit the type of tip being used and the type of material being cast, therefor, it is here shown broken off to indicate that the position of the torch tip is a matter of requirements of the work being done.

While I have here shown the device as being driven by the spring wound motor 17, it must be noted that the device is adapted for being moved by hand as well as by motor and the speed governor is highly desirable for this purpose.

In the hand operated unit, there would be no connection between the drive shaft 27 and the motor shaft 24. The bevel gears are not used. The device is placed on the guide track with the wheels 3, 3' and 4 on the tracks 2 and the gear 30 engaged in the teeth of the rack 5. The device may be moved in either direction along the track and the movement of the device will cause the gear 30 to be rotated by the rack 5, thereby setting the speed governor into operation. Because of the drag or resistance to movement of the speed governor, it will be impossible for the device to be moved suddenly from a stopped position into movement. Speed pick-up will be gradual, in other words. Once the device is in motion it will take but little pressure or pushing to keep it moving at a steady pace along the track and the governor will prevent any sudden changes of pace, of course, either in speeding up or slowing down of the device.

Obviously, if no spring motor were to be used with the device, the member 18, could be a part of or carried on the housing 20, and the shaft 27 could be materially shortened, it being well supported in the yoke 16 and bearing 29.

Figure 3:
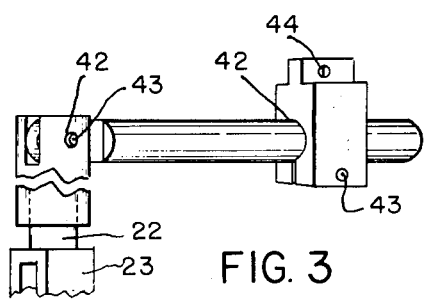
Fig. 3 is a side view of a modified form of rear leg for use in making angle cuts.

In Fig. 3 a modified form of rear leg is shown for use with hard powered operation in making angle cuts. The leg is made in sections which are pivotally connected together as at 42—42 and are secured in any adjusted angular position by means of bolts 43—43. The upper end of the leg has a fitting 44 to receive the torch neck 9.

It is to be understood that I have herein shown and described one specific embodiment of my invention, and that my appended claim is not necessarily limited specifically thereto.

Having thus described my invention, what I claim is:

A support for carrying a cutting torch along a guide composed of a pair of spaced parallel tracks comprising: a plurality of wheels, means mounting said wheels in spaced relation to each other to run on the same one of said pair of tracks, holding means at the upper end of said mounting means to carry said torch, a toothed rack carried adjacent and parallel to said tracks, a speed governor arrangement carried on said mounting means and a gear supported on said mounting means to travel therewith and having an operating engagement with said rack and said governor whereby the travel of said wheels along said track will cause said gear to be rotated by virtue of its connection with said rack, and the rotation of said gear will cause said governor to be operated to control the speed of travel of said torch along said tracks.

References Cited in the file of this patent

UNITED STATES PATENTS

| | | |
|---|---|---|
| 1,318,725 | Bucknam | Oct. 14, 1919 |
| 1,718,192 | Crowe | June 18, 1929 |
| 2,283,347 | Young | May 19, 1942 |
| 2,341,751 | Willoughby | Feb. 15, 1944 |
| 2,431,542 | Caruso | Nov. 25, 1947 |